United States Patent
Alvarado et al.

(10) Patent No.: US 7,865,724 B2
(45) Date of Patent: Jan. 4, 2011

(54) TELECOMMUNICATION TERMINAL COMPRISING TWO EXECUTION SPACES

(75) Inventors: Cuihtlauac Alvarado, Lannion (FR); Jean-Bernard Blanchet, Paris (FR); Laurent Frerebeau, Versailles (FR); Alexandre Frey, Paris (FR); Eric Vetillard, Valbonne (FR); Geoffroy Montel, Paris (FR); Matthieu Maupetit, Paris (FR)

(73) Assignees: France Telecom, Paris (FR); Trusted Logic, Versailles (FR)

( * ) Notice: Subject to any disclaimer, the term of this patent is extended or adjusted under 35 U.S.C. 154(b) by 960 days.

(21) Appl. No.: 10/584,702

(22) PCT Filed: Dec. 17, 2004

(86) PCT No.: PCT/FR2004/003284

§ 371 (c)(1), (2), (4) Date: Mar. 19, 2007

(87) PCT Pub. No.: WO2005/071925

PCT Pub. Date: Aug. 4, 2005

(65) Prior Publication Data

US 2008/0032668 A1    Feb. 7, 2008

(30) Foreign Application Priority Data

Dec. 23, 2003   (FR) ................................... 03 15253

(51) Int. Cl.
   *H04L 29/06*     (2006.01)
(52) U.S. Cl. ............................ 713/166; 726/17; 726/27
(58) Field of Classification Search .................. 726/17, 726/27; 713/166
   See application file for complete search history.

(56) References Cited

U.S. PATENT DOCUMENTS

| 5,621,912 | A | * | 4/1997 | Borruso et al. ................. 718/1 |
| 6,157,721 | A | * | 12/2000 | Shear et al. .................. 380/255 |
| 6,279,091 | B1 | * | 8/2001 | Kikuchi et al. .............. 711/170 |
| 6,415,144 | B1 | | 7/2002 | Findikli et al. |
| 6,496,847 | B1 | * | 12/2002 | Bugnion et al. ................. 718/1 |
| 6,922,835 | B1 | * | 7/2005 | Susser et al. ................ 719/316 |
| 6,944,699 | B1 | * | 9/2005 | Bugnion et al. ............. 710/269 |
| 7,039,033 | B2 | * | 5/2006 | Haller et al. ................. 370/338 |
| 7,069,275 | B2 | * | 6/2006 | Salmen .............................. 1/1 |
| 7,200,848 | B1 | * | 4/2007 | Slaughter et al. ............ 719/317 |
| 7,260,618 | B2 | * | 8/2007 | Ahonen ....................... 709/219 |
| 7,334,076 | B2 | * | 2/2008 | Hendel et al. ................. 711/6 |
| 7,337,436 | B2 | * | 2/2008 | Chu et al. ................... 717/140 |

(Continued)

FOREIGN PATENT DOCUMENTS

WO    WO 00/43878    7/2000

OTHER PUBLICATIONS

"Going Beyond the Sandbox: An Overview of the New Security Architecture in the Java Development Kit 1.2," by Li Gong, et al.; *Proceedings of the Usenix Symposium on Internet Technologies and Systems*; Dec. 8, 1997; pp. 103-112; XP002100907.

*Primary Examiner*—David Garcia Cervetti
(74) *Attorney, Agent, or Firm*—Blakely, Sokoloff, Taylor & Zafman

(57) ABSTRACT

The invention relates to a user interface-equipped computing device comprising means for implementing a series of applications, said means including two execution spaces. According to the invention, the applications of the second execution space (100, P1, 200, P2) have a level of security specifically higher than that of the applications of the first execution space (100, P1, 200, P2), said two execution spaces being hosted by a physical processing means which is designed such that it cannot be separated into two parts without destroying the physical processing means.

12 Claims, 2 Drawing Sheets

U.S. PATENT DOCUMENTS

| | | | |
|---|---|---|---|
| 7,350,194 B1* | 3/2008 | Alpern | 717/124 |
| 7,415,270 B2* | 8/2008 | Wilhelmsson et al. | 455/419 |
| 7,426,721 B1* | 9/2008 | Saulpaugh et al. | 717/144 |
| 7,536,181 B2* | 5/2009 | Solve et al. | 455/419 |
| 7,584,471 B2* | 9/2009 | Bjare et al. | 717/178 |
| 7,640,542 B2* | 12/2009 | Herenyi et al. | 717/177 |
| 2002/0023214 A1* | 2/2002 | Shear et al. | 713/170 |
| 2002/0069263 A1* | 6/2002 | Sears et al. | 709/218 |
| 2003/0121003 A1* | 6/2003 | Soshalsky et al. | 715/513 |
| 2003/0135748 A1* | 7/2003 | Yamada et al. | 713/193 |
| 2003/0181193 A1* | 9/2003 | Wilhelmsson et al. | 455/403 |
| 2003/0182626 A1* | 9/2003 | Davidov et al. | 715/513 |
| 2003/0208748 A1* | 11/2003 | Levin et al. | 717/134 |
| 2003/0224769 A1* | 12/2003 | Solve et al. | 455/418 |
| 2003/0229557 A1* | 12/2003 | Richmann et al. | 705/36 |
| 2003/0232618 A1* | 12/2003 | Le et al. | 455/412.2 |
| 2003/0233465 A1* | 12/2003 | Le et al. | 709/231 |
| 2004/0034853 A1* | 2/2004 | Gibbons et al. | 717/174 |
| 2004/0039741 A1* | 2/2004 | Benson et al. | 707/9 |
| 2004/0142682 A1* | 7/2004 | Kamiya et al. | 455/418 |
| 2004/0153774 A1* | 8/2004 | Gavish et al. | 714/25 |
| 2004/0157593 A1* | 8/2004 | Lee et al. | 455/418 |
| 2004/0158577 A1* | 8/2004 | Chu et al. | 707/103 R |
| 2004/0158813 A1* | 8/2004 | Xia et al. | 717/116 |
| 2004/0267804 A1* | 12/2004 | Fresko et al. | 707/102 |
| 2005/0003810 A1* | 1/2005 | Chu et al. | 455/418 |
| 2005/0034110 A1* | 2/2005 | Lee et al. | 717/141 |
| 2005/0132363 A1* | 6/2005 | Tewari et al. | 718/1 |
| 2005/0138192 A1* | 6/2005 | Encarnacion et al. | 709/230 |
| 2005/0235291 A1* | 10/2005 | Kamiya et al. | 719/315 |
| 2006/0070044 A1* | 3/2006 | Romanovski et al. | 717/136 |
| 2006/0112268 A1* | 5/2006 | Kamiya et al. | 713/165 |
| 2006/0129628 A1* | 6/2006 | Kamiya et al. | 709/203 |
| 2006/0156296 A1* | 7/2006 | Goldberg | 717/168 |
| 2007/0143444 A1* | 6/2007 | Kamiya et al. | 709/219 |

* cited by examiner

TELECOMMUNICATION TERMINAL COMPRISING TWO EXECUTION SPACES

The invention concerns the execution of programmes and applications on a computing device with user interface (keyboard, monitor, sound card, touch-sensitive area, mouse etc.) e.g. on a domestic gateway, a sales machine (public machine for example) or a telecommunications terminal (from PC to mobile phone).

Different approaches are known for implementing applications in telecommunications terminals.

For example the MIDP 2.0 profile on a virtual machine uses a security policy based on open standards, easy to use, placing no demand on the user, which takes into account the needs of each person concerned from development to execution (the concepts of user, operator, OEM, trusted third party are separated).

It affords protection of integrity and verification of the origin of applications during their downloading and execution, control of access to critical resources in accordance with a security policy, user alerting of operations in progress and can even request user opinion.

The security policy is taken into consideration in fairly simple manner at an API to be protected by having recourse to the "check permission" method of the "Midlet" class (FIG. 2).

This requires that the call function of the MIDP file should not be directly accessible from MIDP programmes (protected function).

The MIDP 2.0 security policy is well adapted to the needs of the various persons concerned. The possibility of requesting user opinion in accordance with a certain number of criteria (always, once, for one session, never) is highly advantageous.

Nonetheless its implementation raises two types of problems.

Firstly execution of the protected procedure is made in the same execution space as the caller programme, which facilitates the risk of "leaks". Let us imagine a ciphering service called by two midlets simultaneously, there is nothing to guarantee, if little attention is paid thereto, that one midlet may recover the content of the private key used by the other midlet.

The first problem is therefore lack of security, in particular for risk applications such as payment, signature or DRM applications for example.

Moreover, some feats have shown that with an implementation error it is possible to override this permission system.

The second problem of the MIDP profile is raised by the specifications of the MIDP profile itself. It is not adapted to the formal proof method for programmes. This raises a problem in some sectors (banking sectors in particular) in which a midlet cannot be modelled by formal methods, and hence cannot be checked by these methods.

In other words, no technique exists with which it is possible to prove validity, via formal methods, with respect to the specifications of a programme programmed in this profile.

Another profile, the STIP profile, is more especially adapted for providing access to security-orientated APIs, such as SIM access.

STIP virtual machines (FIG. 3) are used for the functioning of programmes especially written for the STIP profile.

The other asset of STIP is that its programming model and its APIs lend themselves well to analysis by formal methods. This is what prompted its adoption by the banking sector since code conformity to specifications can be proved by formal method.

Therefore the STIP profile used in the banking sector, through its limitations, is adapted to programme proof checking.

However the STIP profile was arranged for closed systems (untrusted applications cannot be downloaded with impunity).

Therefore no security model is set up (in version 2.1.1. of the specification) and hence any STIP application (stiplet) can access any API of STIP type that has already been implemented.

The STIP profile is thus not adapted for producing terminals in which a user is likely to download and implement current applications such as games or various utility applications.

The purpose of the invention is to propose a configuration with which it is possible, in a telecommunications terminal, to implement various user applications and also applications requiring a high level of security.

The invention also sets out to facilitate the programming and implementing of applications, in particular by facilitating the certification of the proper functioning of newly programmed applications.

It is true that the principle is known of mobile telephones hosting two virtual machines in the physical form of two processors, one formed by the terminal itself and the other formed by the SIM card.

The SIM card checks high security requirements, whilst the processor of the terminal itself and its content are accessible to the user.

However, said implementation still has some major disadvantages.

Therefore another purpose of the invention is to propose a device which may or may not be network associated, in which advantage is taken of a securitized space and a non-securitized space, e.g. by allowing the securitized space to access user interfaces such as keyboard or monitor instead of the non-securitized space, and conversely allowing a non-securitized space to access a securitized communication with a known operator to guarantee said security. As security operator, particular mention may be made of telephony operators, mobile telephone operators in particular, banks, suppliers of multimedia items with selective or paying distribution, service providers requiring electronic signature via said device.

Suppliers of multimedia items with selective distribution are particularly "DRMs" (Digital Rights Management) these servers delivering a content that typically relates to music, video, or games under licence, and in a file form which can be read under various constraints e.g. a certain number of times.

One purpose of the invention is to propose said means in which, in addition, there is certainty that the two associated executions spaces (one with a higher security level than the other) are effectively those which are intended or permitted to be associated with each other ab initio.

These purposes are achieved through the invention by means of a computing device with user interface comprising means for implementing a series of applications, these means including in particular a virtual machine/functioning profile execution space, the device comprising a second virtual machine/functioning profile execution space differing from the first by at least its virtual machine or its functioning profile, each execution space hosting applications, the applications of the second execution space being applications with a specifically higher security level than the applications of the first execution space on account of the fact that the applications of the first execution space are applications set up and activated by the terminal user, whilst the applications of the second execution space are applications which cannot be modified by the terminal user, characterized in that the two execution spaces are hosted by a physical processing means which is arranged so that it cannot be separated into two parts without destroying this physical processing means.

The invention also proposes a method for implementing applications within a computing device with user interface, the method having recourse to means for implementing a series of applications, these means including in particular a virtual machine/functioning profile execution space and a second virtual machine/functioning profile execution space differing from the first by at least its virtual machine or its functioning profile, each execution space hosting applications, the applications of the second execution space being applications with a specifically higher security level than the applications of the first execution space on account of the fact that the applications of the first execution space are applications set up and activated by the terminal user, whilst the applications of the second execution space are applications which cannot be modified by the terminal user, characterized in that the two execution spaces are hosted by a physical processing means which is arranged so that it cannot be separated into two parts without destroying this physical processing means.

Other characteristics, purposes and advantages of the invention will become apparent on reading the following detailed description which refers to the appended figures in which.

The particular embodiment described below makes it possible to take best advantage of both techniques, MIDP and STIP, given as an example within a coherent execution environment.

The "user" profile is formed therein, the MIDP profile. This profile is very popular in the world of cell phones for creating games and various utility applications. The user is able to download and execute applications found on the network in the same way as with a usual MIDP telephone. The MIDP profile therefore includes applications set up and activated by the users themselves.

Here the STIP profile forms an additional profile, and more specifically an "operator" profile. The STIP profile is well adapted to applications requiring a high security level, such as banking applications. Banking consortiums have already placed their trust in the possibility using formal methods to certify STIP applications for their implementation in electronic payment terminals (EPT).

With the present invention it is therefore possible to provide developers with an operator API assembly whose execution is ensured in an execution space appropriate for easy programming by these developers, a space of whether or not of same profile, and fully separate.

This embodiment therefore enables operators to provide a batch of securitized applications such as payments, signature or.DRM, that is fully independent from the execution profile for "routinet" applications.

Figure 1:
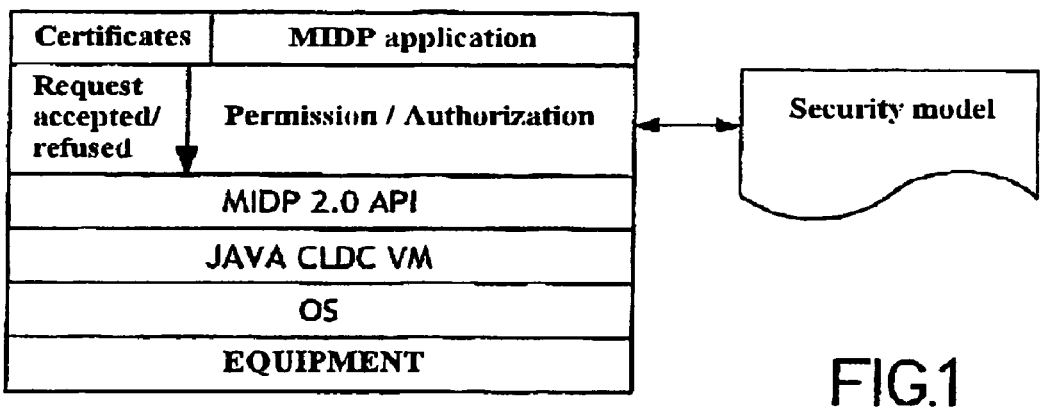
FIG. 1 is a schematic illustrating a MIDP implementation of the prior art
Figure 2:
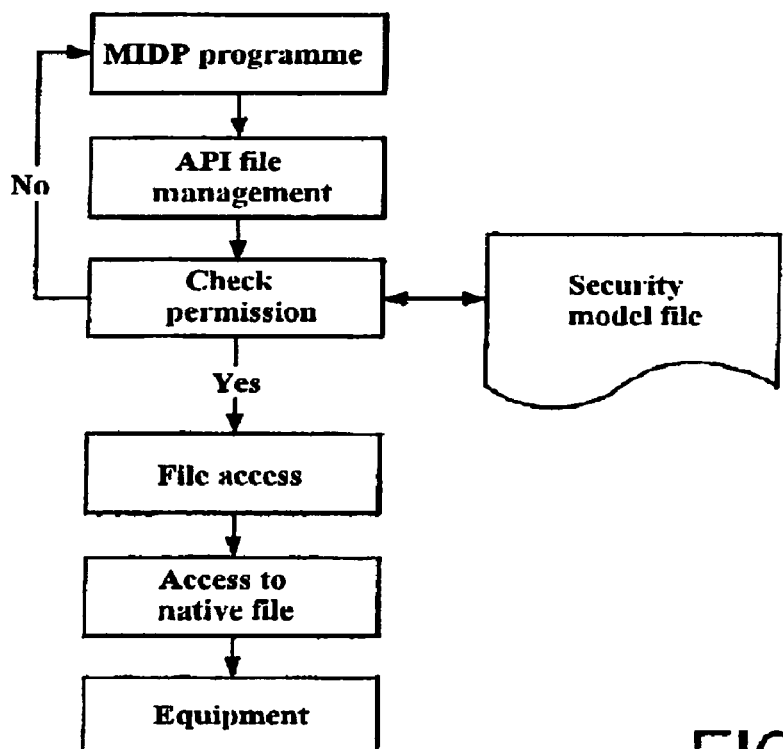
FIG. 2 is a schematic illustrating the implementation of protection means in a said MIDP implementation.
Figure 3:
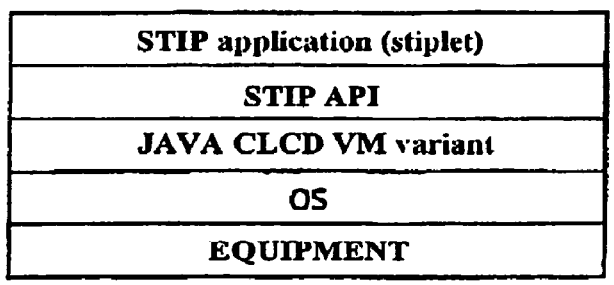
FIG. 3 is a schematic illustrating a prior art STIP implementation
Figure 4:
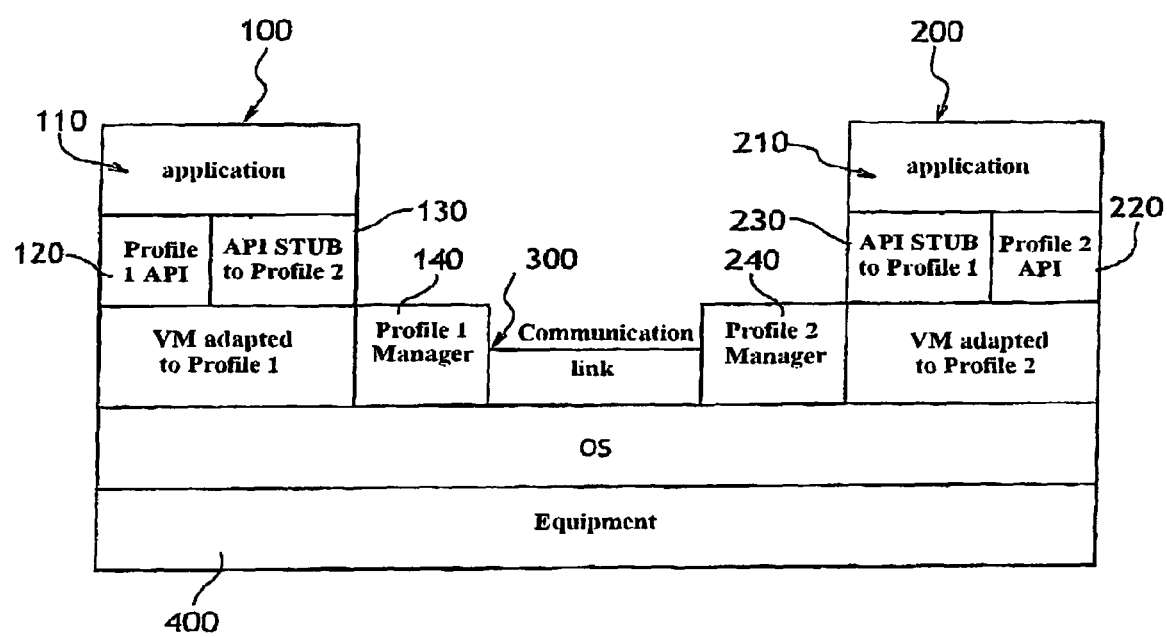
FIG. 4 illustrates a functional configuration of an inventive terminal according to a preferred variant.

The terminal shown FIG. 4 includes and causes to operate in harmony two virtual machines 100 and 200 of separate profiles P1 and P2 (or not separate). One 100 of the two machines is dedicated to user applications, the other 200 to operator applications.

The corresponding profiles P1 and P2, here respectively the MIDP profile and the STIP profile, are themselves respectively dedicated to user applications and operator applications.

FIG. 4 shows two virtual machines 100 and 200.

The "user" virtual machine 100 can be used by the user to download, install, uninstall, execute, stop applications in the MIDP profile as and when desired. The applications 110 operating therein use the API 120 of this profile and an API "stub" having the same profile as the machine 100, this API stub being referenced 130 in FIG. 4.

The second machine, referenced 200 is the "operator" virtual machine: only the operator e.g. the mobile telephone operator or the internet operator (access supplier), via an over the Air (OTA) mechanism, is able to administrate this execution space.

The operator can, at will, install, uninstall, activate, deactivate therein applications 210 written as per the formalism of profile 100. These applications 210 have access to APIs 220 of profile P2 and to one or more high level APIs illustrated under reference 230 in FIG. 4.

These high level APIs 230 allow access to services offered by the profile of machine 100. API access, whether from the profile of machine 200 or the stub 230 to the profile of machine 100 is made in accordance with the security model inherent in the profile of machine 200.

The API "stub" 130 is a high level API, expressed as per the programming model of profile 100, providing access to services offered by profile P2. API access, whether to the profile of the machine 100 or a stub 130 is made in accordance with the security model inherent in the profile P1 of machine 100.

The functioning of stubs 130 and 230 is as follows:

The call to an API of stub 130, 230 is converted into a flow of octets (called either serialization process or marshalling/unmarshalling).

This flow is received by a manager 140, 240 of the opposite profile via a communication channel 300, deserialized and converted into execution of a procedure in the remote profile. The return execution of this procedure is again serialized in the remote profile and passes again in the communication channel 300 between the two profiles P1 and P2 of machines 100 and 200, the reply is deserialized in the original profile and converted into a return call of the API "stub".

In this way there are two independent execution spaces each consisting here of a different machine and a different profile, and in very close relationship via the API stub 130 and 230.

As a variant, the two profiles P1 and P2 may be of same type e.g. two MIDP profiles or two STIP profiles for two different machines.

It will also be noted that it is possible to adopt two different profiles P1 and P2 within one same virtual machine.

This embodiment therefore offers a payment API to developers of MIDP applications, in which the payment itself is made under the execution of a virtual STIP machine controlled by the operator.

In other words, a MIDP application, easily developed, could offer the user a means of payment by causing a payment application of machine 200 to operate via the communication channel 300. A MIDP application, through the invention, is therefore able to offer a payment functionality that is highly reliable.

The two execution spaces 100 and 200 each formed of a virtual machine/execution profile pair, differing from one another through the profile or the virtual machine, are both implemented however by one same physical processing device 400 (same hardware entity 400).

This processing device hosting the two execution spaces. is unique in that it cannot be divided into two without destroying its functioning.

It is therefore impossible to physically separate the two execution spaces, and it is hence also impossible to associate a space thus separated with another space which is not authorized.

Said achievement with a single means is obtained for example by implementing the two execution spaces on one same integrated circuit forming a single processor.

It is thereby ensured that two environments, one securitized and the other non-securitized, are inseparable.

The security offered by an operator (telephony, banking, signature administration, multimedia distributor) is thereby improved whether to prevent security overriding in payment functions, to ensure confidentiality or non-usurpation of secret codes, to ensure reliability of electronic signatures or to monitor limited user rights for payable services.

Advantageously the P1, P2 profiles of each of the two execution spaces 100, P1, 200, P2 are respectively a STIP profile and a profile forming part of the group made up of STIP, MIDP, OSGI and ".net" profiles.

The invention claimed is:

1. Computing device with user interface comprising a physical processing means, said physical processing means including:
   a first virtual machine
   a second virtual machine;
   wherein an execution space is defined in each virtual machine;
   wherein the execution spaces of the first and second virtual machines host applications;
   wherein the applications hosted in the execution space of the second virtual machine have a higher level of security than that of the applications hosted in the execution space of the first virtual machine;
   wherein the applications of the execution space of the first virtual machines are user-modifiable applications;
   wherein the applications of the execution space of the second virtual machines are user-unmodifiable applications;
   wherein the two virtual machines are separable only by destruction of the physical processing means; and
   wherein the first and second virtual machines are distinct and each of the first and second virtual machines is associated with a single corresponding execution profile.

2. Device as in claim 1, wherein the applications hosted in the execution space of the second virtual machines are application modifiable by a security operator chosen among: telephone operators, banks, providers of multimedia items with selective or paying distribution, service providers operating in exchange of electronic signature via said device.

3. Device as in claim 1, wherein said device is a telephone terminal.

4. Device as in claim 3, wherein said device is a mobile telephone terminal.

5. Device as in claim 1, further comprising means for communicating between the first and second execution spaces.

6. Device as in claim 5, wherein one execution space comprises processing means, and wherein the means for communicating between the first and second execution spaces are configured such that the processing means is usable by an application hosted in the other execution space.

7. Device as in claim 5, wherein one execution space comprises resources accessible by selected applications, and wherein the means for communicating between the first and second execution spaces comprises an API stub enabling use of resources of the execution space by the other execution space.

8. Device as in claim 5, wherein the means for communicating between the first and second execution spaces comprises means for implementing serialization/deserialization or marshalling/unmarshalling.

9. Device as in claim 1, wherein each of the first and second execution spaces comprises at least one separate API.

10. Device as in claim 1, wherein one execution space comprises a STIP type profile.

11. Device as in claim 1, wherein one execution space comprises a MIDP-type profile.

12. Device as in claim 1, wherein one execution space comprises a STIP-type profile and the other execution space comprises a profile, the type of which is chosen amidst: STIP, MIDP, OSGI and ".net".

* * * * *